United States Patent [19]
Murray

[11] 4,398,960
[45] Aug. 16, 1983

[54] CONCRETE MIXES

[75] Inventor: John A. Murray, Norristown, Pa.

[73] Assignee: Conger/Murray Systems, Inc., Palm Beach, Fla.

[21] Appl. No.: 337,062

[22] Filed: Jan. 4, 1982

[51] Int. Cl.$^3$ ............................................... C04B 7/02
[52] U.S. Cl. ........................................ 106/97; 106/98
[58] Field of Search .................. 106/97, 98, 104, 118, 106/120

[56] References Cited

U.S. PATENT DOCUMENTS

| | | | |
|---|---|---|---|
| 2,517,993 | 8/1950 | Falco | 106/97 |
| 2,529,841 | 11/1950 | Goddin et al. | 106/98 |
| 2,585,366 | 2/1952 | Bollaert et al. | 106/98 |
| 2,987,408 | 6/1961 | Minnick | 106/98 |
| 4,310,486 | 1/1982 | Cornwell et al. | 106/98 |

Primary Examiner—James Poer
Attorney, Agent, or Firm—Austin R. Miller

[57] ABSTRACT

A concrete mix which comprises solids in the amount of:
(a) 5–25% by weight of a calcareous cementitious binder;
(b) 50–70% by weight of a coarse aggregate having a particle size in a range of about ⅜" to larger than 30 mesh, and
(c) 25–35% by weight of a fine aggregate having a particle size in a range of about 100-pan mesh, and water, said mix being substantially free of aggregate having a particle size in the range of 30–50 mesh.

12 Claims, No Drawings

CONCRETE MIXES

BACKGROUND OF THE INVENTION

This invention relates to a method and composition for the manufacture of concrete and like products, particularly, concrete and cinder block, and substantially all other conventional building products and the like.

The term "concrete," as it is employed in this specification, refers to a stone-like product obtained by blending a cement, aggregate such as sand, gravel, crushed stone, and many other like additives, and water together in appropriate amounts, and allowing the mixture to harden and reach an advanced state of cure. "Concrete-like" is extremely broader, and encompasses the materials having certain physical properties of concrete products, having perhaps substitutes for aggregate normally so used. They may be load-bearing or non load-bearing and may if desired include binders and/or aggregates that are selected to impart desired structural characteristics and/or decorative characteristics to the final product.

DESCRIPTION OF THE PRIOR ART

In the prior art method of manufacturing concrete products, for example, the cement, aggregate, additives if any, and water are blended in various ratios. In general, a sufficient amount of water is added to completely hydrate the cement and also to impart a degree of fluidity (substantial liquidity) to the blended mixture generally referred to as a wet mix. The blended mixture is then poured or compacted into a form and allowed to take an initial set. The initial set usually occurs within ½ hours to 4 hours, depending upon the temperature and the particular concrete mixture employed. The concrete product, after this initial set, is solid, but has very little strength. In order to obtain the maximum strength possible with a given concrete composition using the prior art manufacturing techniques, the concrete is generally allowed to cure for a period of time from several days, to several weeks.

The excessively long period of time required for both the initial set, and particularly for the development of the ultimate strength, causes considerable problems in the manufacture of cast concrete products. The concrete mixture must remain in the mold until the product acquires sufficient strength that it will not fall apart when the mold is removed. Furthermore, the concrete product, even after the mold is removed, must be allowed to cure for an extended period of time before it is subjected to any substantial stresses. The need to maintain the concrete products in the mold until the initial set is obtained, and for curing the products until the ultimate strength is developed requires a substantial inventory of molds and a rather large storage area for the products being processed. Of even greater consequence is the cost involved in the prior art processes since the handling of weak products obtained after the initial set and the storage of products for several days or weeks until fully cured is quite costly in both man power and storage space. Often, of even greater consequence is the cost in terms of rejects or of imperfections in the products due to internal stresses and even fractures that result from handling a weak product. Other deficiencies in prior art techniques include the shrinkage characteristics of the panels, especially high shrinkage during an extended period of cure, and differential shrinkage rates, e.g., between the outer surface and the inside of the product.

In the conventional method, a concrete mixture containing the desired type of aggregate is either poured or compacted into a suitable panel mold. The mold is then stored until the mixture initially sets. This usually requires a discontinuous process, rather than a continuous sequence of steps. As the panel is initially stored, and until an advanced state of set takes place, the panel cannot be ground or polished since the machine involved, such as diamond grinding teeth, wheels, or the like, or other abrasive materials, would cause the panel to disintegrate.

A further problem encountered with cast concrete products in general, and even other concrete-like products, is that often, using the prior art mixes, products are obtained which lack sufficient compressive strength. In order to compensate for the relatively low compressive strength, the products have to be cast with thicker cross-sections as the length and width increases so as to provide the required strength.

This materially adds to the cost of the product, the cost of the transportation of the finished product, and the cost of installation of the product.

Attempts have heretofore been made to decrease the cure time in the manufacture of concrete and like products. Such attempts have included the various types of accelerators that have been added to concrete mixtures, as well as heating and steaming processes, for use during manufacture. These methods at best have produced marginal improvements with respect to reducing the curing time and have been somewhat expensive. For example, in high pressure steam curing the product often had to be steamed for twelve to twenty-four hours, in order to obtain a satisfactory hardness and strength in the final product. In addition, certain of the processes had adverse effects upon the composition. High pressure steaming of concrete products containing substantial amounts of marble or limestone, for example, causes a very marked decrease in the ultimate compressive strength of the final product.

In order to increase the strength of concrete products, certain additives have heretofore been suggested. These additives include materials which to some extent plasticize the finished concrete product so as to increase its compressive strength. Additives have been suggested to improve the properties of concrete products, including bituminous materials and various types of rubbers and emulsions of synthetic resins.

Other prior art techniques have been developed that are usable, to a certain degree, with certain of the processes that have been developed for many of the materials set forth above. For example, it is known to treat certain concrete-like products with carbon dioxide gas, by storing the products in a chamber that has been pre-charged with gas, for the purpose of effecting a skin cure on the surface of the products, and of a limited depth of cure, sufficient to enable further handling of the products. Indeed, generally, with the formation of a skin cure, that cure in itself inhibits deeper curing by the use of the carbon dioxide gas.

Other treatment processes have been developed, such as the use of alternate exposure to steam and carbon dioxide gas.

OBJECTS OF THE INVENTION

The present invention relates to a novel concrete mix which can be compressed into a desired building product configuration and can be rapidly cured and possesses sufficient strength for handling while in a green state.

It is accordingly an object of the present invention to overcome the above-mentioned and numerous other problems and difficulties existing in the prior art.

It is a further object of the invention to provide novel concrete compositions which can be rapidly and substantially fully cured.

It is an additional object of the present invention to provide a process for preparing concrete and like products, wherein the products have improved green strength.

Other objects and advantages of the present invention will become readily apparent to those skilled in the art from a reading of the following detailed description of the preferred embodiments and the appended claims.

SUMMARY OF THE INVENTION

It has now been discovered that the particle size and particle size gradations of the aggregate or blend of aggregates employed, is critical to the present invention.

More particularly the proportion of fine aggregate of a particular particle size to coarse aggregate of a particular particle size is critical to obtaining a mix containing a minimum water content, which can be quickly cured by carbon dioxide gas, and possesses desirable green strength. In the present invention, coarse aggregate is defined as aggregate having a particle size of about $\frac{3}{8}$" to larger than 30 mesh preferably $\frac{3}{8}$" to 16 mesh, and fine aggregate is defined as aggregate that has a particle size in a range of about 100-pan mesh. Pan mesh being defined as a particle size which is smaller than 200 mesh.

It is further critical in the present invention that all of the solids in the mix are in the following amounts:

Coarse aggregate: 50-70% by weight
Fine aggregate: 25-35% by weight
Cement or binder: 5-25% by weight.

Preferably, the solids in the mix comprise about 60-65% by weight of coarse aggregate, about 25-35% by weight of fine aggregate and about 5-10% by weight of cement or binder. The greater the amount of fine aggregate utilized, the smoother the finish of the final product. It is still further essential to the present invention to substantially screen out materials having a particle size from about 30-50 mesh. At most, only about 5 to 10% of 30-50 mesh material should be allowed to be present. The screening step is uniquely applicable to a carbon dioxide curing process since removal of the fine particles greatly assists in obtaining greater penetration of the carbon dioxide into the product so as to yield more effective curing.

It will be noted that concrete and concrete-like products continue to undergo a state of curing for an indefinitely long period of time, perhaps thirty years or more. In this application, when reference is made to the substantially fully cured, completely cured, fully cured or the like, it will be understood that what is intended is that the cure is sufficiently advanced to enable not only handling of the product, but also further vigorous processing, such as but not limited to grinding, in that state of cure, without breaking, crumbling, or disintegration of the product, and that this substantially fully cured product continues to cure over a long period of time toward an absolutely complete cure.

The present invention is directed to providing method and composition for the manufacture of concrete products, wherein calcareous cementitious binder, such as cement, the desired aggregate, and a minor amount of water are to be blended. The mix is then compressed into the desired shape in a mold. The shape thus formed is then treated with carbon dioxide gas which causes a rapid exothermic reaction to occur during which the article is either mostly cured, or substantially fully cured in a matter of a few minutes, although the method and composition of this invention could be used to provide less than a substantially complete cure, if the circumstances made such a use so desirable. The cured product exhibits substantially improved immediate physical properties, and in particular, compressibe green strength as compared to similar products produced in the conventional manner.

DESCRIPTION OF THE PREFERRED EMBODIMENTS

The composition of this invention is comprised of three principal ingredients, namely calcareous cementitious binder, that may or may not include portland or like cements, an aggregate, and water.

In many instances, it is desirable to utilize portland cement as the binder material. However, it has been found that other types of materials may be used in lieu of portland cement, or with portland cement, to give desired properties. In many instances, such mixture of portland cement and other binders may be dictated by economics, such as the availability of materials. In other instances, an alternate mix is specifically preferred, as to include various portions of other binders, in addition to, or instead of portland cement.

The cement which is used in the method of this invention can be the common commercially available types. In this specification specific reference will be made to portland cement but it should be appreciated that other similar hydraulic cements can likewise be used in the method of this invention. Portland cement compositions are comprised of about 60-70% by weight of $CaO$, 17-25% by weight of $SiO_2$, 3-8% by weight of $Al_2O_3$, minor amounts of other oxides such as $Fe_2O_3$, $MgO$, $Na_2O$, $K_2$ and about 1-3% by weight of $SO_3$. As in all concrete-forming processes, it is important that the cement be kept as dry as possible prior to the formation of the starting mixture since the oxides comprising the cement will hydrate in the presence of water, and a weaker product will be obtained if the cement is partially hydrated prior to formation of the shaped article from the mixture.

Other calcareous cementitious materials that may be used as binders include calcareous lime, metamorphic marble dust, calcareous lime dust, calcareous fly ash, calcareous cement of various types, such as white, grey or block grey cement, aqua dust, calcareous lummite, calcareous quick lime, all of various types. All of these materials contain calcium carbonate in one form or another, in that they are all calcareous. All of these materials are available at various locations in the earth, in that they are either found in sedimentary rocks, or in metamorphic rocks, for example, at various depths within the earth, in virtually every location of the earth.

The aggregates that are used in the present invention can be selected from almost an unlimited variety of different materials. The most commonly employed aggregates for use in the present invention are sand, gravel, marble dust, marble chips, granite dust, granite chips and crushed limestone. However, other types of materials which can be advantageously employed as aggregates are sea shells, broken glass, especially colored glasses, and masonry-type building rubble such as crushed concrete, mortar and crushed bricks and stone. As can be seen from the above, the choice of the particular aggregate which can be used in a method of this invention is quite extensive.

The selection of the particular aggregate is dependent upon a combination of several factors. These include the physical properties desired in the final concrete product; the decorative effect desired in the final product, and the availability and the cost of the aggregate. The particular aggregate or combination of aggregates employed has a marked effect on the ultimate strength of the concrete product. As is well known, neat cement, when mixed with water and allowed to set and cure will develop a certain minimal amount of strength. However, when an aggregate is added, the aggregate reinforces the product and results in a product having a considerably higher ultimate strength. The strength of concrete products is dependent to a large extent upon the strength of the aggregate employed, with stronger aggregates resulting in stronger concrete products.

In accordance with the present invention, in its broader aspects, the aggregate may also be selected from a group that includes ground glass, sand, calcareous limestone, clay, siliceous shale, extrusive lava, siliceous silica flour, gravel, marble, marble dust, siliceous limestone, granite, coarse grained granite, shells, quartz, aqua dust, slate, calcareous sandstone, gneise, schist, siliceous trap, and quartzite, and even metallic components, such as steel rods, brass chips, etc. and forms thereof. These aggregates are also generally available in nature, and comprise sediments, ignetious materials, sedimentary materials, and metamorphic materials. In some instances, the metamorphic materials may be either follated, and in others non-follated, and still may function as aggregates. Materials used as binders need not occur as rocks in nature, but such sedimentary and metamorphic materials may take various forms.

The removal of substantial portions of 30-50 mesh particles greatly assists in the penetration of carbon dioxide gas if the concrete mixture is to be subjected to the carbon dioxide in a curing process. Further, it allows the formation of a green block of minimum moisture content which still possesses the requisite strength to maintain the integrity of the block shape until curing has taken place.

It has now been discovered that the greater amount of 30-50 mesh particles present, the greater amount of water required in order to provide a molded cement product which can retain its shape and still have sufficient green strength to withstand travel over conveyors and handling. Also, the smaller the amount of water that is employed, the smaller the requirement for energy in curing the product, and the shorter the time required for removal of water vapor from the block during curing.

Moreover, the carefully selected particle size gradation provides voids which enhance and accelerate such water vapor removal.

The specific percentages of the various components utilized in preparing the concrete mix of this invention, that is, the coarse aggregate, the fine aggregate and cement or binder, is essential for obtaining a green cementitious product which requires a minimum of water, has excellent green strength, and can be suffficiently cured utilizing carbon dioxide gas in a matter of minutes so as to permit shipment to the building site without further curing or storage.

The final essential starting material for mixtures employed in preparing the cementitious products of this invention is, of course, water. Water, as is well known to those skilled in the art is required for hydration of the oxides comprising the portland cement. This is also true with respect to the other calcareous cementitious binders employed herewith. In prior art processes, an amount of water had to be used which was at least theoretically required for a complete hydration of the oxides comprising the portland cement. In general, a considerable excess was employed in order to compensate for the amounts of water required for wetting out of the aggregate and also provide a somewhat fluid mixture to facilitate the handling of the concrete mixture. As previously stated, in the method of this invention a considerably lesser amount than the theoretical amount of water required for complete hydration is employed, and quite surprisingly, a superior product is obtained.

In practicing the present invention, there is only utilized an amount of water that is sufficient for the cementitious product to retain its shape. The water used in the method of this invention does not require any special chemical pre-treatment, but is of the type that is ordinarily available, and of which is ordinarily used to make concrete.

It will further be noted that other additives may be employed, in conjunction with the practice of this invention, such as dyes, colorings and the like, either being added with the water or copolymer, or such may be employed as parts of the aggregate utilized, or even as components of the binder that is utilized. The amount of water required for each mix is largely dependent upon the type of aggregate utilized. Periodic sampling is helpful to arrive at a point where the mix will retain its shape.

The following are Examples which show the concrete mixes of the present invention and their preparation. They are to be construed as illustrations of the present invention and are not intended to be limitations thereof.

EXAMPLE I

Building blocks were prepared from the following mixture:

Crushed concrete: 20 kgs
Crushed burnt face brick: 10 kgs
Limestone: 18 kgs
Portland cement: 8.67 kgs Crushed concrete is screened through a ⅝" mesh screen to obtain 20 kgs of material. Similarly crushed burnt face brick is screened through a 16 mesh screen to obtain 10 kgs of material. All 30-50 mesh particles are then screened out of the coarse aggregate. Limestone is screened through a 150 mesh screen to obtain 18 kgs of fine aggregate which is then mixed together with the screened crushed concrete and crushed burnt face brick. 8.67 kgs of portland cement is added to the mixture.

The mixture was blended until uniform, and then water was slowly added with agitation with sampling to determine the point where the mix retains its shape. The mixture contained about 1 part by weight of water.

The desired mixture was compressed into blocks 8"×12"×2½" thick. The blocks were then cured by passing through a carbon dioxide chamber.

The green blocks were found to possess excellent strength and did not deform on handling. Also, curing time in the carbon dioxide chamber was 2 minutes and a substantially cured product was obtained.

EXAMPLE II

The procedure of Example I was repeated except that the following mixture was employed:
Expanded shale aggregate: 32 kgs
Fine limestone: 18 kgs
Portland cement: 6.67 kgs Only enough water was added to bind the mixture together and the mixture was molded to form concrete blocks having dimensions of 8"×8"×16".

The blocks were placed on a conveyor and passed through a carbon dioxide chamber. Carbonation was noted as extending into the deeper areas and the product was virtually completely dry and cured after 4 minutes.

EXAMPLE III

A concrete mix was formed having the following composition:
Pumice: 34 kgs
Silica flour: 22 kgs
Hydrated lime: 6.7 kgs
Wetting agent: 4 oz.
Retarder: 4 oz.

Pumice which was screened through ⅜" screen and particles of 30-50 mesh were removed. Silica flour having a particle size of 100-pan mesh was combined with the hydrated lime. All of the ingredients were then blended in a mixer for one hour.

The wetting agent and retarder were added with enough water to bind the ingredients together and the mixture was molded to form concrete blocks having the dimensions 8"×8"×16". The molded blocks were placed on racks in a carbon dioxide chamber. Steam and carbon dioxide gas were introduced. After 7 minutes the blocks were fully cured.

The retarding agents which are included as a portion of the various mixes are conventional retarding agents which are widely used for retarding the rate at which concrete products set. The retarding agents are usually ligno sulphonates which are by-products of the paper industry. An acceptable retarding agent is sold under the trademark "FIDICON" by Edict Laboratories, Milwaukee, Wis. or the Solar Granules #40 sold by Swift and Company.

Although the invention has been described with regard to particular preferred examples and embodiments of the same, many changes and modifications will become obvious to those skilled in the art in view of the foregoing description. The invention is, therefore, intended to be limited only as necessitated by the scope of the appended claims and not to what has been shown herein.

What is claimed is:

1. A concrete mix for forming concrete products curable with carbon dioxide gas which comprises solids in the amount of:
   (a) 5-25% by weight of a calcareous cementitious binder;
   (b) 50-70% by weight of a coarse aggregate having a particle size in a range of about ⅜" to larger than 30 mesh, and
   (c) 25-35% by weight of a fine aggregate having a particle size in a range of about 100-pan mesh, and water, said mix being substantially free of aggregate having a particle size in the range of 30 to 50 mesh.

2. A concrete mix according to claim 1, wherein the solids in the mix comprise about 60-65% by weight of coarse aggregate, about 25-35% by weight of fine aggregate and about 5-10% by weight of binder.

3. A concrete mix according to claim 1, wherein said calcareous cementitious binder is portland cement.

4. A concrete mix according to claim 1, wherein said fine aggregate is limestone.

5. A concrete mix according to claim 1, wherein water is present in an amount which is sufficient for the mixture to retain a formed configuration.

6. A concrete mix according to claim 5, which is formed in a building product configuration.

7. A concrete mix according to claim 6, wherein said building product is a cinder block.

8. A process for preparing a concrete mix for forming concrete products that are curable with carbon dioxide gas which comprises combining solids in an amount of:
   (a) 5-25% by weight of a calcareous cementitious binder;
   (b) 50-70% by weight of a coarse aggregate having a particle size in a range of about ⅜" to larger than 30 mesh, and
   (c) a fine aggregate having a particle size in a range of about 100-pan mesh, and water, said mix being substantially free of aggregate having a particle size in a range of about 30-50 mesh.

9. The process according to claim 8, wherein the solids and the mix comprise about 60-65% by weight of coarse aggregate, about 25-35% by weight of fine aggregate and about 5-10% by weight of binder.

10. The process according to claim 8, wherein said calcareous cementitious binder is portland cement.

11. The process according to claim 8, wherein said fine aggregate is limestone.

12. The process according to claim 8, including compressing said combined mix into a building product configuration.

* * * * *